United States Patent
Kato et al.

(10) Patent No.: US 7,002,095 B2
(45) Date of Patent: Feb. 21, 2006

(54) SPOT WELDING SYSTEM AND METHOD OF CONTROLLING PRESSING FORCE OF SPOT WELDING GUN

(75) Inventors: Tetsuaki Kato, Hadano (JP); Koichi Okanda, Yamanashi (JP); Soichi Arita, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 116 days.

(21) Appl. No.: 10/679,318

(22) Filed: Oct. 7, 2003

(65) Prior Publication Data

US 2004/0069750 A1    Apr. 15, 2004

(30) Foreign Application Priority Data

Oct. 11, 2002    (JP)    ............................ 2002-298423

(51) Int. Cl.
  B23K 11/24    (2006.01)
(52) U.S. Cl. ................................. 219/86.41; 219/86.32
(58) Field of Classification Search ............ 219/86.25, 219/86.41, 86.51, 86.32; 318/432
  See application file for complete search history.

(56) References Cited

U.S. PATENT DOCUMENTS

| | | | |
|---|---|---|---|
| 5,582,747 A | 12/1996 | Sakai et al. | |
| 6,232,572 B1 | 5/2001 | Kanjo | |
| 6,342,686 B1 | 1/2002 | Farrow | |
| 6,486,629 B1 * | 11/2002 | Kato et al. | 318/432 |
| 6,900,607 B1 * | 5/2005 | Kleinau et al. | 318/432 |

FOREIGN PATENT DOCUMENTS

| | | |
|---|---|---|
| JP | 61-112585 | 5/1986 |
| JP | 2000-224812 | 8/2000 |
| JP | 2002-035953 | 2/2002 |
| JP | 2002-051595 | 2/2002 |
| JP | 2002-165478 | 6/2002 |

OTHER PUBLICATIONS

EP Search Report for corresponding EP Application No. 03 25 6355 mailed Oct. 1, 2004.
Notice of Grounds of Rejection for corresponding Japanese Application No. 2002-298423 mailed Aug. 3, 2004.

* cited by examiner

Primary Examiner—Clifford C. Shaw
(74) Attorney, Agent, or Firm—Staas & Halsey LLP

(57) ABSTRACT

A spot welding system using a spot welding gun having a servomotor for driving welding tips capable of suppressing variation of pressing force due to influence of heat generated by welding current to obtain an uniform pressing force. A difference between the temperature T detected by a temperature sensor and an initial temperature T0 is multiplied by a coefficient A to obtain a pressing force compensation amount α. A pressing force d estimated by an observer is subtracted from the compensated command pressing force p' and an obtained difference is multiplied by a constant K2 to obtain a torque command (current command) τ for driving the servomotor to press the objects by the welding tips. Since the commanded pressing force is compensated in accordance with the temperature, a constant and stable pressing force is produced without influence of the temperature variation.

19 Claims, 3 Drawing Sheets

SPOT WELDING SYSTEM AND METHOD OF CONTROLLING PRESSING FORCE OF SPOT WELDING GUN

BACKGROUND OF THE INVENTION

1. Field of the Invention

The present invention relates to a spot welding system using a spot welding gun driven by a servomotor and a method of controlling a pressing force of the spot welding gun.

2. Description of Related Art

In performing a spot welding operation using a spot welding gun, objects of welding such as metal plates are clamped and pressed by a pair of welding tips of the spot welding gun and an electric current is flown between the welding tips through the objects to be fused together by Joule heat generated by the electric current. A spot welding gun using a servomotor for driving the welding tips is known as a servo welding gun.

FIG. 4 schematically shows a conventional welding system using the servo welding gun in which the welding tips are driven by a servomotor.

The spot welding gun 1 comprises arms 3a, 3b having welding tips 2a, 2b respectively at distal ends thereof, a ball screw/nut mechanism 4 for converting a rotary motion to a linear motion, and a servomotor 5 for driving the arm 3a relative to the arm 3b through the ball screw/nut mechanism 4 to open/close the welding tips 2a and 2b for clamping and applying a pressing force on objects of welding. A position detector 6 is provided at the servomotor 5 to detect a rotational position of the servomotor 5 and thus linear position of the welding tips 2a, 2b. In general, a controller 10 for controlling the servo spot welding gun 1 is constituted by a robot controller for controlling a robot to which the welding gun 1 is attached. Specifically, a servo CPU 12 for controlling the servomotor 5 is additionally provided in the robot controller or a servo CPU provided in the robot controller for controlling servomotors for axes of the robot may be utilized as the servo CPU 12 for controlling the servomotor 5 of the spot welding gun 1.

A main CPU 11 of the controller 10 issues a command for operating a robot to move the spot welding gun 1 to a predetermined welding position and then issues a motion command to the servomotor 5 of the spot welding gun 1. The servo CPU 12 performs position feedback processing based on the motion command and feedback signals from the position detector 6 and outputs current commands (torque commands) for the servo amplifier 13. The servo amplifier 13 drives the servomotor 5 to move the arm 3a relative to the arm 3b by flowing a driving current in the servomotor 5 in accordance with the current command so that the welding tips 2a and 2b move closer to each other.

When the welding tip 2a is moved to a predetermined position relatively to the welding tip 2b, the main CPU 11 issues a control changeover command and a pressing force command to the servo CPU 12. Upon receipt of these commands, the servo CPU 12 switches the position feedback control to a pressing force control and issues a current command (torque command) to the servo amplifier 13 for driving the servomotor 5 so that a commanded pressing force is applied to the objects by the welding tips 2a and 2b. Then, a welding current is flown between the welding tips 2a and 2b through the objects to fuse the objects together, and after the welding the welding tips 2a and 2b are opened and the welding gun 1 is moved to a next welding position.

As described, the servomotor 5 for driving the welding tips 2a and 2b is arranged relatively closer to the welding tips 2a and 2b in the welding gun 1. The Joule heat generated by the welding current flown between the welding tips 2a and 2b through the objects rises temperature of the servomotor 5 and temperature of movable components of a drive force transmission mechanism including the arm 3a, 3b and the ball screw/nut mechanism 4 of the spot welding gun 1 to a high degree. For reducing the high temperature, the distal ends of the arms 3a, 3b and the welding tips 2a, 2b of the spot welding gun 1 are regularly water cooled, and the servomotor is water cooled in some spot welding guns.

In general, an output torque of an electric motor decreases as temperature thereof increases. An output torque of the electric motor is expressed by the following equation.

Output torque=torque constant×electric current

It is known that the torque constant varies in dependence on temperature of the motor so that it decreases as the temperature increases from the disclosure of JP 2002-165478 A, for example.

Since the temperature of the servomotor of the spot welding gun is increased by the Joule heat generated by the welding current and heat generated by the motor itself, the output torque decreases with the decrease of the torque constant caused by the high temperature, so that the pressing force of the welding tips is lowered.

The variation of the torque constant with variation of the temperature of the servomotor caused by the heat generation of the motor itself is not so large to be negligible, but the temperature rise of the servomotor caused by the Joule heat generated by the welding current are large. Thus, the torque constant is decreased to lower the torque of the servomotor 5 for driving the welding tips 2a, 2b.

Further, in the servo spot welding system, the servo amplifier 13 flows the driving current in the servomotor 5 to produce an output torque in accordance with the current command from the servo CPU 12 and the output torque is converted from rotary motion to linear motion by a motion converting mechanism such as the ball screw/nut mechanism 4 to linearly move the welding tips 2a, 2b so that a pressing force is applied on the objects, as shown in FIG. 5.

In converting the rotary motion to the linear motion to produce a linear force, a relation between the output torque of the motor and the converted linear force is ideally expressed as follows;

Force(N)=Torque(Nm)/(an amount of linear motion per one rotation of the motor×2π).

In practice, the above relation is not established because of energy loss caused by friction, etc. It is known that a friction loss depends on temperature of movable components of the motion converting mechanism.

Thus, the servo spot welding system is influenced by the Joule heat generated by the welding current such that the torque constant of the servomotor 5 for driving the welding tips 2a, 2b varies (the torque constant is lowered with temperature rise) and the friction loss of components of a driving force transmission mechanism including the ball screw/nut mechanism and the arms varies with the variation of temperature (the friction loss is lowered with temperature rise). Therefore, there arises a problem of failing in applying a constant pressing force on the objects of welding by the welding tips in accordance with a commanded pressing force by complex effect of the variation of the torque constant and the variation of the friction loss with the high temperature.

SUMMARY OF THE INVENTION

The present invention provides a spot welding system using a servo spot welding gun and a control method of a pressing force of the servo spot welding gun, which are capable of suppressing variation of the pressing force by influence of heat generated by a welding current so that a uniform pressing force is applied to objects of welding.

A spot welding system of the present invention is for performing spot welding operations using a spot welding gun having a servomotor for driving welding tips to apply a pressing force on object of welding, and comprises: a temperature sensor arranged at a suitable position for detecting temperature of the servomotor or movable components of the spot welding gun; and a controller for controlling the servomotor such that the welding tips apply a predetermined pressing force on the objects of welding based on the temperature detected by the temperature sensor. The controller may compensate a commanded pressing force using a relation between variation of the temperature and variation of the pressing force.

A control method of the servomotor of the spot welding gun of the present invention comprises: detecting temperature of the servomotor or movable components of the spot welding gun; and controlling the servomotor such that the welding tips apply a predetermined pressing force to the object of welding based on the detected temperature. A commanded pressing force may be compensated using a relation between variation of the temperature and variation of the pressing force.

DETAILED DESCRIPTION

In the servo spot welding gun in which welding tips are driven by a servomotor, the torque constant of the servomotor and also friction loss of movable components of the driving force transmission mechanism by influence of heat generation in the spot welding gun. Therefore, the pressing force applied on the objects of welding from the welding tips varies in dependence on the temperature of the servomotor and the movable components of the spot welding gun even in a condition of a constant driving current of the servomotor (the same pressing force command). Experiments have been conducted in which the temperature and the pressing force of the spot welding gun are measured in performing spot welding operations repeatedly under conditions of a constant driving current in the servomotor and a constant welding current between the welding tips. Results of the experiments are shown in FIG. 3.

Figure 3:
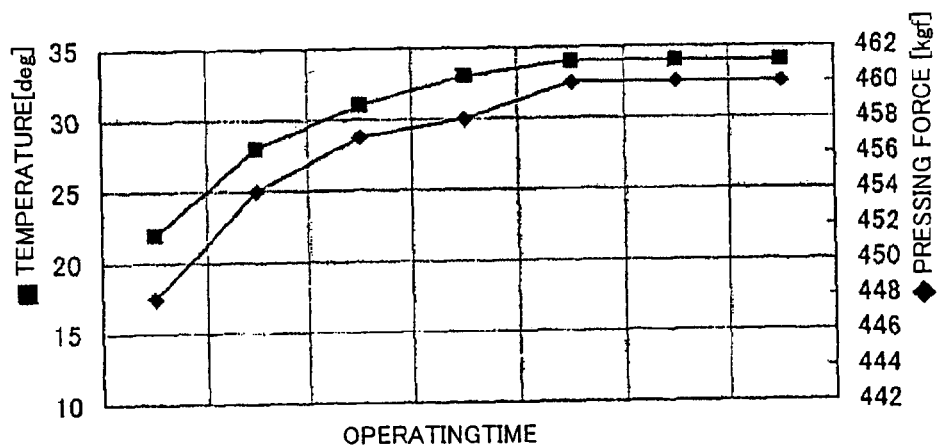
FIG. 3 is a graph showing results of experiments showing a relation between variation of temperature and variation of a pressing force of the spot welding gun.

As shown in FIG. 3, the pressing force by the welding tips increases as the temperature increases. It is presumed that the influence of lowering of the friction loss with the temperature rise excesses the influence of lowering of the torque constant of the servomotor with the temperature rise, so that the pressing force increases as the temperature increases.

In view of the results of the experiments, a relation between the variation of the temperature and the variation of the pressing force is approximated by a linear function, and a coefficient A for converting an amount of change of temperature to an amount of change of pressing force is obtained in this embodiment. In other words, the coefficient A represents an amount of change of the pressing force per unit amount of change of the temperature.

Figure 1:
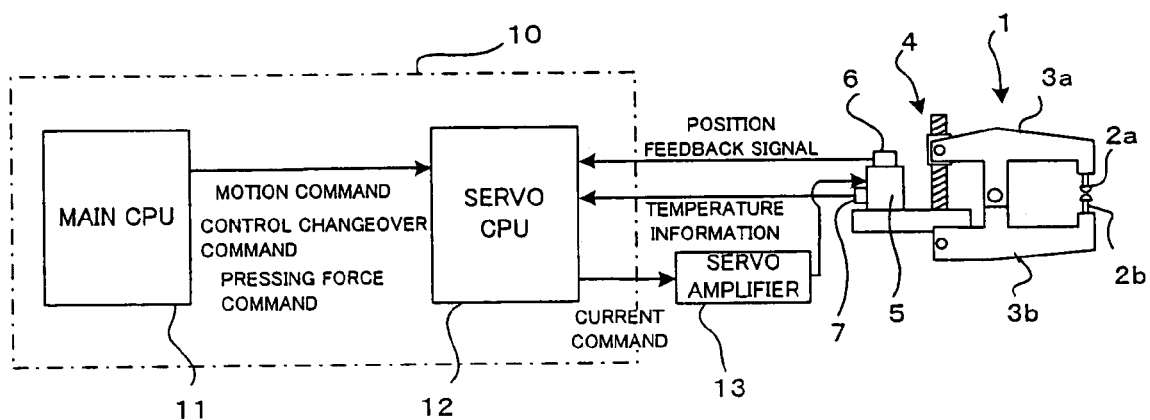
FIG. 1 is a schematic block diagram of a spot welding system including a spot welding gun and a controller therefor according to an embodiment of the present invention.

FIG. 1 shows a spot welding system including a servo spot welding gun and a controller therefor according to the embodiment of the present invention.

Figure 4:
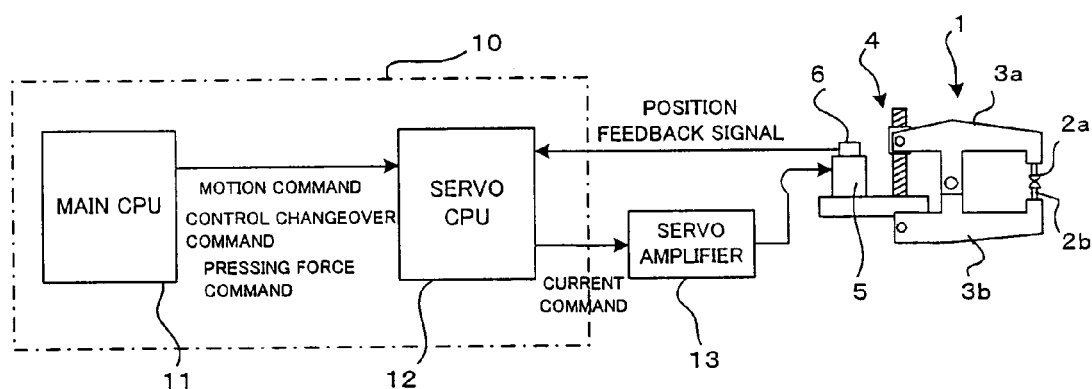
FIG. 4 is a schematic block diagram of a conventional spot welding system.

The spot welding system differs from the conventional spot welding system as shown in FIG. 4 in that a temperature sensor 7 is provided in the welding gun 1 and that processing for temperature compensation of the pressing force is performed.

The temperature sensor 7 is arranged at the servomotor 5 or in the vicinity of movable components of the spot welding gun 1 such as the ball screw/nut mechanism 4. In this embodiment, the temperature sensor 7 is arranged at the servomotor 7. A controller 10 for controlling the servo spot welding gun 1 is constituted by a robot controller for controlling a robot to which the welding gun 1 is attached, or provided separately from the robot controller.

A coefficient A for conversion of an amount of change of the temperature to an amount of change of the pressing force is obtained in advance on the basis of results of experiments and set for the servo CPU 12 as a parameter. A temperature detected by the temperature sensor 7 in predetermine a pressing force to be applied to the objects of welding as one of welding conditions is set as an initial temperature T0 as a parameter.

The main CPU 11 issues commands for operating the robot to move to a taught position for performing a welding operation designated in a taught operation program so that a workpiece can be clamped at a predetermined position by the welding tips 2a and 2b of the spot welding gun 1, and then successively issues a motion command, a control changeover command and a pressing force command to the servo CPU 12.

Figure 2:
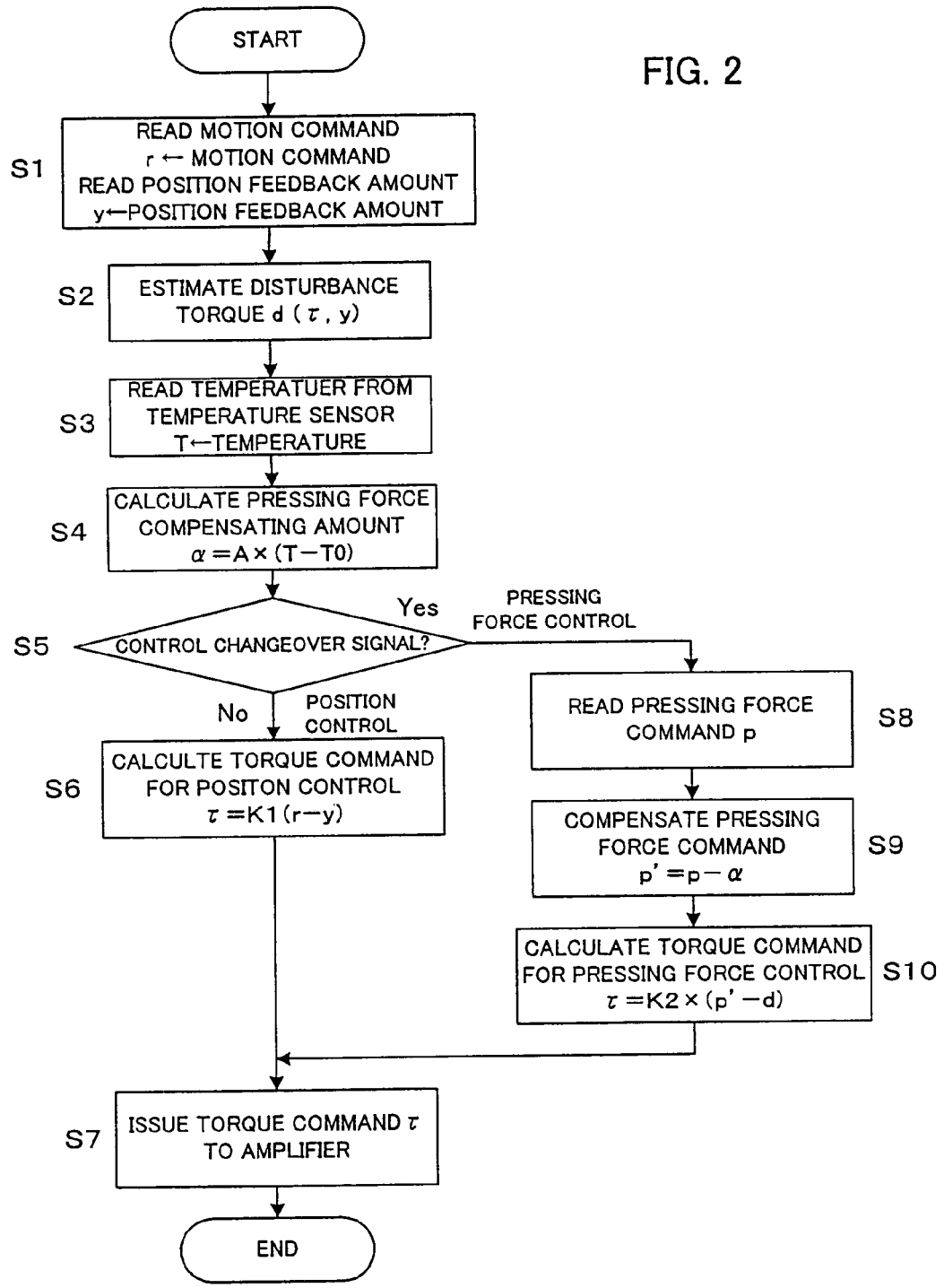
FIG. 2 is a flowchart of processing for a welding operation by the spot welding gun according to the embodiment.

The servo CPU 12 performs processing as shown in FIG. 2 including processing for the temperature compensation of the pressing force, upon receipt of motion commands for the welding tips 2a and 2b, a control changeover command and a pressing force command from the main CPU 11.

The servo CPU 12 reads the motion command r from the main CPU 11 and a position feedback amount y sent from the position detector 6 (Step S1). Then, the servo CPU 12 estimates a disturbance torque d using a disturbance torque observer built in the servo CPU 12 (Step S2). The estimated disturbance torque d represents, the pressing force while the welding tips 2a and 2b presses objects of welding. The temperature T detected by the temperature sensor 7 is read and a calculation according to the following equation (1) is performed to obtain a compensation amount α by multiplying a difference between the detected temperature T and the initial temperature T0 by the coefficient A.

$$\alpha = A \times (T - T0) \qquad (1)$$

Then, it is determined whether or not a control changeover signal has been issued, and if not, a torque command (current command) τ is obtained by multiplying a proportional coefficient K1 by a difference of the motion command r and the position feedback amount y read in Step S1, according to the following equation (2).

$$\tau = K1 \times (r - y) \tag{2}$$

The obtained torque command (current command) τ is issued to the servo amplifier 13 (Step S7), and the processing of the present processing period is terminated.

Subsequently, the processing from Step S1 to Step S7 is repeatedly executed at every processing period until a control changeover signal is issued. When a control changeover command and a pressing force command are issued, the procedure proceeds from Step S5 to Step S8 where the pressing force command p is read and the pressing force compensating amount α is subtracted from the pressing force command p, to obtain a compensated pressing force p' (Step S9).

$$p' = p - \alpha \tag{3}$$

The estimated torque (estimated pressing force) d is subtracted from the obtained compensated pressing force command p' obtained in Step S2 and the obtained difference is multiplied by the proportional coefficient K2 of the pressing force feedback control to obtain a torque command (current command) τ (Step S10). The obtained torque command (current command) τ is issued to the servo amplifier 13 (Step S7) and the processing of the present processing period is terminated.

Subsequently, the processing of Steps S1–S5, Steps S8–S10 and Step S7 is repeatedly executed to perform temperature compensation on the commanded pressing force so that the predetermined pressing force is obtained, and a torque command (current command) τ for driving the servomotor 5 is obtained so that the estimated pressing force coincides with the compensated pressing force command. Since the commanded pressing force p is compensated in accordance with the detected temperature, and the torque command τ is obtained based on the compensated pressing force command p', the torque command τ is compensated in accordance with the temperature to produce the predetermined pressing force on the workpiece by the welding tips 2a and 2b.

Then, the predetermined welding current is flown between the welding tips 2a and 2b for a set time to fuse the objects together, and after the elapse of set time the welding tips are opened and the welding gun is moved to the next welding position.

Since the pressing force compensation amount α is required when the control mode is changed from the position control to the pressing force control upon receipt of a control changeover signal, the processing of Steps S2–S4 may be performed immediately before or immediately after the processing of Step S8. In this case, the procedure proceeds from Step S1 to Step S5.

In the foregoing embodiment, the relation between the variation of temperature and the variation of pressing force is approximated by a linear function. The relation may be approximated by a quadric function or a higher order function and other functions. Further, the coefficients A may be set for a plurality of bands of the temperature. Furthermore, the amount of change (compensation amount α) of the pressing force for the amount of change of the temperature may be stored in a table and the pressing force compensation amount α may be read from the table.

According to the present invention, the variation of the pressing force caused by the variation of the torque constant of the servomotor and the friction loss of the driving mechanism with variation of temperature of the spot welding gun is suppressed, to maintain a stable pressing force to enhance welding quality of spot welding operations. The present invention is particularly useful in a case of adopting a servomotor of non water-cooled type as the servomotor of the spot welding gun.

What is claimed is:

1. A spot welding system for performing spot welding operations using a spot welding gun having a servomotor for driving welding tips to apply a pressing force on objects of welding, comprising:
   a temperature sensor arranged at a suitable position for detecting a temperature of the servomotor and movable components of the spot welding gun; and
   a controller for controlling the servomotor such that the welding tips apply a predetermined pressing force on the objects of welding based on the temperature detected by said temperature sensor.

2. A spot welding system according to claim 1, wherein said controller compensates a commanded pressing force using a relation between variation of the temperature and variation of the pressing force.

3. A spot welding system according to claim 1, further comprising a water-cooled system for the servomotor, distal ends of arms, and the welding tips of the spot welding gun.

4. A method of controlling a pressing force applied on objects of welding from welding tips driven by a servomotor of a spot welding gun for performing spot welding operations, comprising:
   detecting a temperature of the servomotor and movable components of the spot welding gun; and
   controlling the servomotor such that the welding tips apply a predetermined pressing force to the object of welding based on the detected temperature.

5. A method of controlling a pressing force of a spot welding gun according to claim 4, wherein said controlling of the servomotor includes compensating a commanded pressing force using a relation between variation of the temperature and variation of the pressing force.

6. A method of controlling a pressing force applied on objects of welding from welding tips driven by a servomotor of a spot welding gun for performing spot welding operations, comprising:
   determining a temperature of the servomotor and movable components of the spot welding gun;
   calculating a pressing force compensating amount taking into account the temperature and the pressing force; and
   controlling the servomotor such that the welding tips apply a predetermined pressing force to the object of welding based on the determined temperature.

7. A method of controlling a pressing force applied on objects of welding from welding tips driven by a servomotor of a spot welding gun for performing spot welding operations according to claim 6, further comprising:
   determining whether or not a control changeover signal has been issued to the servomotor, and if so,
   reading a pressing force command;
   compensating the pressing force command; and
   calculating a torque command for pressing force control.

8. A method of controlling a pressing force applied on objects of welding from welding tips driven by a servomotor of a spot welding gun for performing spot welding operations according to claim 7, wherein said compensating the pressing force command uses an equation of form: p'=p−a.

9. A method of controlling a pressing force applied on objects of welding from welding tips driven by a servomotor of a spot welding gun for performing spot welding operations according to claim 7, wherein said calculating a torque command for pressing force control uses an equation of form: τ=K2×(p'−d).

10. A method of controlling a pressing force applied on objects of welding from welding tips driven by a servomotor of a spot welding gun for performing spot welding operations according to claim 6, wherein said calculating pressing force compensating amount taking into account temperature and the pressing force uses an equation of form: α=A×(T−T0).

11. A method of controlling a pressing force applied on objects of welding from welding tips driven by a servomotor of a spot welding gun for performing spot welding operations according to claim 6, further comprising estimating a disturbance toque using a disturbance toque observer built in a servo CPU.

12. A method of controlling a pressing force applied on objects of welding from welding tips driven by a servomotor of a spot welding gun for performing spot welding operations according to claim 11, wherein said estimating disturbance toque is derived from a toque command and position feedback amount sent from a position detector.

13. A method of controlling a pressing force applied on objects of welding from welding tips driven by a servomotor of a spot welding gun for performing spot welding operations according to claim 6, further comprising:
    determining whether or not a control changeover signal has been issued to the servomotor, and if not,
    calculating a torque command for position control.

14. A method of controlling a pressing force applied on objects of welding from welding tips driven by a servomotor of a spot welding gun for performing spot welding operations according to claim 13, wherein said calculating a torque command for position control uses an equation of form: τ=K1×(r−y).

15. A method of controlling a pressing force applied on objects of welding from welding tips driven by a servomotor of a spot welding gun for performing spot welding operations according to claim 6, wherein said calculating a pressing force compensating amount taking into account the temperature and the pressing force uses a linear function, a quadratic function, or a higher order function.

16. A method of controlling a pressing force applied on objects of welding from welding tips driven by a servomotor of a spot welding gun for performing spot welding operations according to claim 6, further comprising storing the pressing force compensating amount in a table.

17. A method of controlling a pressing force applied on objects of welding from welding tips driven by a servomotor of a spot welding gun for performing spot welding operations according to claim 6, further comprising reading the pressing force compensating amount from a table.

18. A method of controlling a pressing force applied on objects of welding from welding tips driven by a servomotor of a spot welding gun for performing spot welding operations according to claim 6, further comprising cooling the servomotor, distal ends of arms, and the welding tips of the spot welding gun with a water-cooled system.

19. A method of controlling a pressing force applied on objects of welding from welding tips driven by a servomotor of a spot welding gun for performing spot welding operations according to claim 6, further comprising determining a relation between variation of the temperature and variation of the pressing force using experimentation.

* * * * *

UNITED STATES PATENT AND TRADEMARK OFFICE
CERTIFICATE OF CORRECTION

PATENT NO. : 7,002,095 B2 Page 1 of 1
APPLICATION NO. : 10/679318
DATED : February 21, 2006
INVENTOR(S) : Tetsuaki Kato et al.

Figure 5:
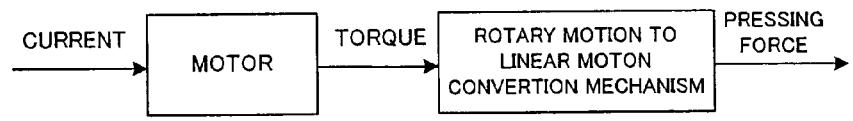
FIG. 5 is a schematic block diagram of a driving system of the spot welding gun including a motion converting mechanism for converting a rotary motion of the servomotor to a linear motion.

It is certified that error appears in the above-identified patent and that said Letters Patent is hereby corrected as shown below:

Sheet 3 of 3 in the Drawings, FIG. 5, delete "CONVERTION" and insert --CONVERSION-- column 4, line 58 delete "represents," and insert --represents-- column 7, line 2 in claim 8, delete "p'=p-a." and insert p'=p-$\alpha$.-- column 7, line 20 in claim 11 delete "toque" and insert --torque-- column 7, line 20 in claim 11 delete "toque" and insert --torque-- column 7, line 26 in claim 12, delete "toque" and insert --torque-- column 7, line 26 in claim 12, delete "toque" and insert --torque--

Signed and Sealed this

Eighth Day of August, 2006

JON W. DUDAS
*Director of the United States Patent and Trademark Office*